(12) United States Patent
Dauner et al.

(10) Patent No.: US 6,941,194 B1
(45) Date of Patent: Sep. 6, 2005

(54) MOTOR VEHICLE COMMUNICATION SYSTEM AND METHOD FOR EXCHANGING DATA IN A MOTOR VEHICLE

(75) Inventors: Oskar Dauner, Esslingen (DE); Robert Foerster, Woerth (DE); Fridjof Goebel, Heilbronn (DE); Konrad Hoess, Parsberg (DE); Jutta Schneider, Erlangen (DE); Sandra Schneider, Stuttgart (DE)

(73) Assignees: Siemens Aktiengesellschaft, Munich (DE); Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/856,321

(22) PCT Filed: Nov. 19, 1999

(86) PCT No.: PCT/DE99/03697

§ 371 (c)(1),
(2), (4) Date: Nov. 19, 2001

(87) PCT Pub. No.: WO00/31606

PCT Pub. Date: Jun. 2, 2000

(30) Foreign Application Priority Data

Nov. 20, 1998 (DE) .............................. 198 53 665

(51) Int. Cl.[7] ........................................... G06F 17/00
(52) U.S. Cl. .............................. 701/1; 701/36; 79/110; 79/240
(58) Field of Search ............................. 701/1, 36, 48; 709/100, 103, 104, 105, 110, 225, 229, 240

(56) References Cited

U.S. PATENT DOCUMENTS

| | | | |
|---|---|---|---|
| 5,414,845 A | 5/1995 | Behm et al. ................. | 395/650 |
| 5,655,081 A | 8/1997 | Bonnell et al. ......... | 395/200.32 |
| 5,699,250 A * | 12/1997 | Kobayashi .................... | 701/48 |
| 5,960,035 A * | 9/1999 | Sridhar et al. .............. | 375/219 |
| 6,009,363 A * | 12/1999 | Beckert et al. ................ | 701/33 |

FOREIGN PATENT DOCUMENTS

| | | |
|---|---|---|
| DE | 195 48 354 | 7/1996 |
| DE | 690 25 957 | 10/1996 |
| DE | 196 25 002 | 1/1998 |
| DE | 197 43 249 | 4/1998 |
| EP | 0 625 838 | 11/1994 |

(Continued)

OTHER PUBLICATIONS

Patent Abstract of Japan; Publication No. 10275298; Oct. 13, 1998.
"Schone neue Welt;" Zeitschrifft mot, Heft-Nr. 21/1997, S.20, month is not available.

*Primary Examiner*—Tan Q. Nguyen
(74) *Attorney, Agent, or Firm*—Morgan, Lewis & Bockius LLP

(57) ABSTRACT

A vehicle communication system has at least one processor unit (1), arranged in the vehicle, for controlling applications, a plurality of different data sources (2, 4, 5, 6, 8) which are connected to the processor unit (1), and a plurality of operator consoles (9) which are connected to the processor unit (1). Access rights with different degrees of priority to the applications are allocated to the individual operator consoles (9).

11 Claims, 2 Drawing Sheets

U.S. PATENT DOCUMENTS

Figure 1:
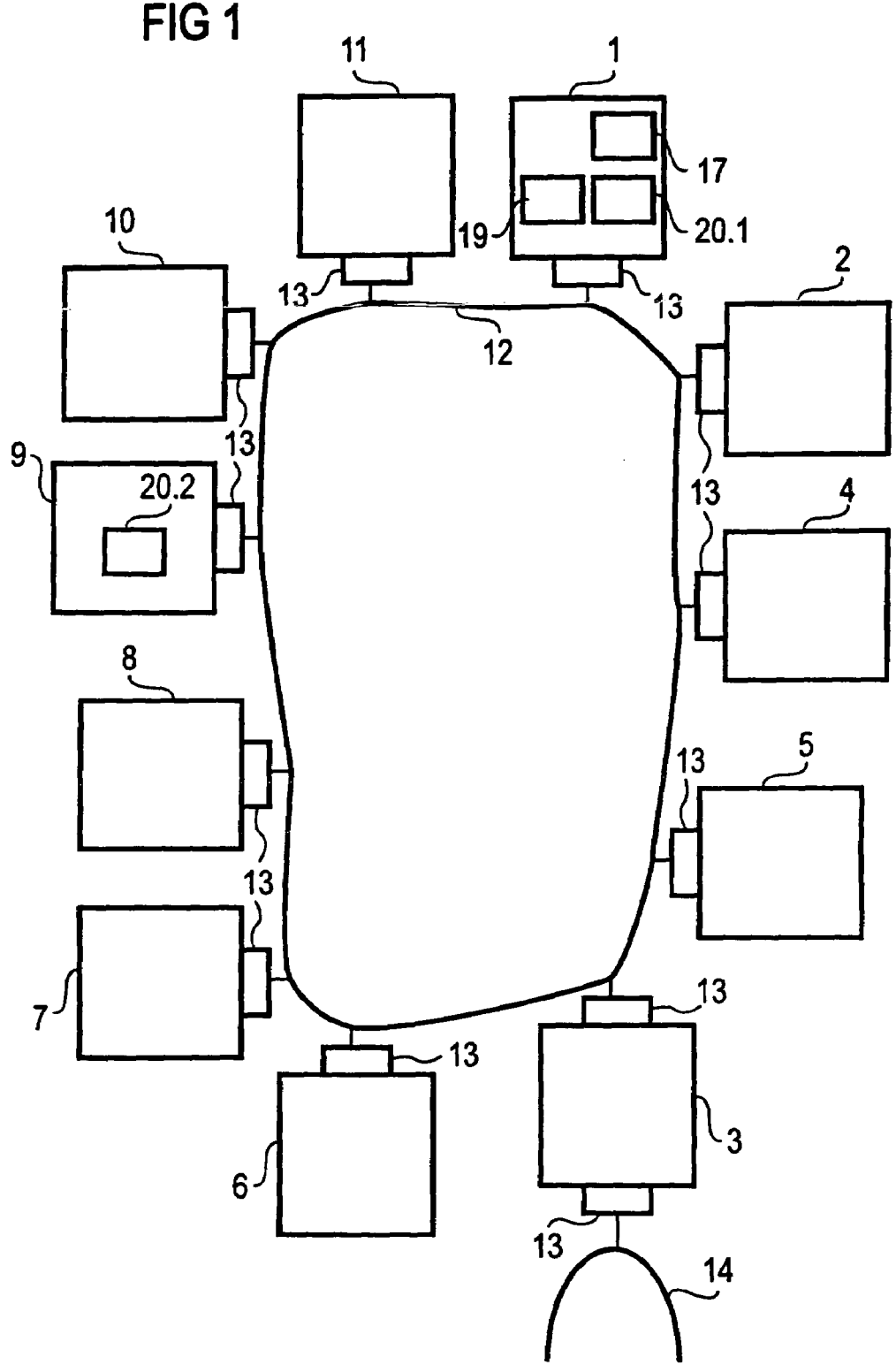

| | | | |
|---|---|---|---|
| 6,023,232 A * | 2/2000 | Eitzenberger | 340/988 |
| 6,038,500 A * | 3/2000 | Weiss | 701/22 |
| 6,112,101 A * | 8/2000 | Bhatia et al. | 455/512 |
| 6,240,340 B1 * | 5/2001 | Minowa et al. | 701/1 |
| 6,275,231 B1 * | 8/2001 | Obradovich | 345/970 |

FOREIGN PATENT DOCUMENTS

| | | |
|---|---|---|
| EP | 0 682 838 | 10/1997 |
| EP | 0 683 951 | 11/1997 |
| EP | 0 836 167 | 4/1998 |
| WO | 96/19361 | 6/1996 |
| WO | 97/03399 | 1/1997 |
| WO | 98/26958 | 6/1998 |
| WO | 98/34812 | 8/1998 |

* cited by examiner

MOTOR VEHICLE COMMUNICATION SYSTEM AND METHOD FOR EXCHANGING DATA IN A MOTOR VEHICLE

The invention relates to a vehicle communication system and a method for exchanging data in a vehicle, in which data are exchanged between a plurality of different data sources which are connected to at least one processor unit, and a plurality of operator consoles which are connected to the process unit.

The laid-open publication DE 196 25 002 A1 discloses a vehicle communication system with a central processor unit for carrying out telematic applications and with interfaces via which equipment units for transmitting and connecting data can be connected to the central processor unit. The equipment units are assigned to the various telematic applications in a flexibly controllable fashion. With this system, a user can access different telematic applications in a flexible way.

The periodical mot, volume No. 21/1997, presents, on pages 20 to 21, an Internet multimedia system in a passenger car in which a driver can access external information services. At the rear of the vehicle, flat screens are provided for interactive games for passengers. Functions available in the vehicle can be output on the screens, through loudspeakers or headsets via an audio/video switch.

The patent application WO 97/03399 discloses a method in which the user of a networked computer is provided, on his user interface, with a list of application programs which are available to him in a computer network.

The U.S. Pat. No. 5,655,081 relates to a computer network in which different computer types can be connected to one another. Software which monitors the resources and applications of a computer system runs on each server of the computer system. Using the software of the individual servers of the computer system, administration software installed on a computer of the system is provided with a list of all the resources and applications present on the entire system and their status.

The patent application EP 0 625 838 A2 discloses a token ring network which has workstations on which both conventional application programs and multimedia application programs run. The latter do not usually exhibit tolerant behavior toward delays during the exchange of data. For this reason, the network has three priority levels. Before a multimedia application is started, testing takes place to determine whether the network can provide a sufficiently high data throughput.

The international patent application WO 98/26958 relates to a fault-resistant control system for a car in which different components are integrated. A master control unit administers the data flow between the components via a bus. The master control unit is operated with a configurable Windows operating system.

The international patent application WO 98/34812 discloses a multimedia unit for a motor vehicle in which a user can select an option from a multiplicity of options presented on a screen.

The patent EP 0 547 052 B1 discloses an adaptive display for vehicles in which information is classified and presented on a screen as a function of its ranking.

The laid-open publication DE 197 43 249 A1 discloses a navigation device which makes a selection for the driver when a multiplicity of information items are present. The selection is determined by means of a defined priority sequence.

An object of the invention is to make available a vehicle communication system and a method for exchanging data in a vehicle in which a plurality of operator consoles are configured differently and can thus be set individually to the requirements or desires of different occupants of a vehicle.

This object is achieved with a vehicle communication system and a method such as are defined in the independent patent claims. Advantageous embodiments of the invention are specified in the subclaims.

The provision of a central system controller makes it possible to allocate to the different operator consoles individual and different access rights to the applications. The central system controller is implemented in a central processor unit or in another processor unit of the vehicle communication system. Here, the ranking which an operator console is assigned can be specified either uniformly for all the applications or individually for each application. For example, the operator console of the driver of a vehicle may be allocated the highest priority in terms of a navigation device, while on the other hand the allocation of an access right to a television receiver to the driver of a vehicle may be refused completely or only while the vehicle is being driven. In addition, the central system controller may assign output devices to operator consoles.

Each operator console can be configured individually by means of the operator console controller. Such a configuration can conceivably relate to the user prompting at the man/machine interface, the assignment of running applications or their menus to the defined positions of a display device, of the access right of applications to an output device of the operator console, or the like.

In one particularly preferred embodiment, a plurality of functions are assigned to one application. The application may be, for example, an application such as vehicle navigation. This application is assigned the functions of routine calculation, navigation information calculation, on position determination by means of GPS (Global Positioning System), position determination by means of compound navigation and the outputting of visual or audible navigation information. A function which can be executed can be implemented within the device by means of hardware or software. An application can access functions which are carried out by different pieces of equipment.

Each function preferably has a software interface for exchanging data with other software interfaces or hardware interfaces.

In one particularly preferred embodiment, the central system controller has a central priority management system. One aspect of the central priority management system may be, for example, the assignment of access rights for the operator consoles to a data bus and/or to applications. One further aspect of the central priority management system may be the assignment of access rights for applications to the data bus or to operator consoles. When a plurality of actions which are subject to priorities (for example two operator consoles with specific priorities request an application with specific priorities on the same physical piece of equipment which does not have a multi-console capability) coincide, the central priority management system resolves possibly occurring conflicts in favor of one of the actions. The time ranking of the action is also a suitable decision criterion here.

When the capacity limit or a defined threshold is reached, the data transmission of a low ranking application is preferably aborted in favor of a higher-ranking application or its data transmission rate is reduced. In this way, it is ensured that, for example in the case of an accident, an automatic emergency call can be made even though the transmission capacity of the bus is completely taken up by other applications.

In the case of a conflict in which an application would have to be terminated or its data transmission reduced in order to allocate access to the data bus to another application, weighting of the access rights can be acquired from a priority right of an application and the priority right of that operator console which is accessing the application. The weighting can be calculated with weighting factors which are stored in a matrix in a memory location of the processor unit.

In one particularly preferred embodiment, the graphic user interface of an operator console can be adapted for the different requirements of a particularly practised user, a less practised user and of a child by means of presettings. Thus, for example only easily understood symbols without labeling are provided for the child, a very detailed menu with submenus is provided for the less practised user and short menus and keyboard abbreviations are provided for the practised user.

Figure 2:
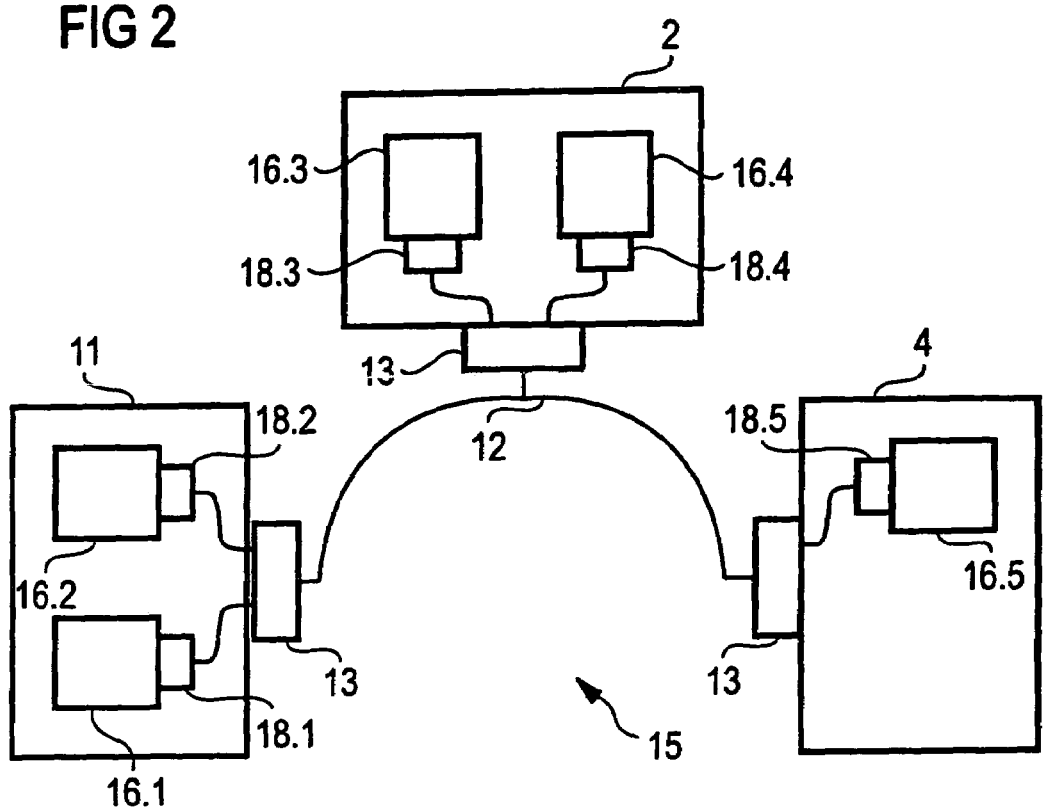
Figure 3:
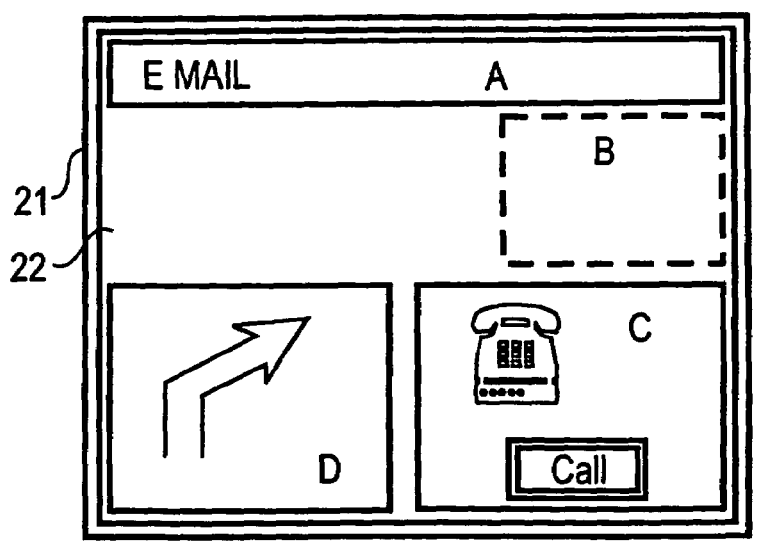

Further features, advantages and possible applications of the invention emerge from the following description of exemplary embodiments in conjunction with the drawings, in which:

FIG. 1 shows a schematic overview of components of a vehicle communication system, FIG. 2 shows a schematic representation of an application which is distributed among the vehicle communication system, and FIG. 3 shows a user interface which is represented on a screen.

FIG. 1 illustrates a vehicle communication system in a passenger car having a multiplicity of data sources and data sinks. It has a process unit 1 with a freely available memory and an operating system, a navigation unit 2, a gateway 3 for setting up a connection to a vehicle bus which is embodied as a Can bus 14, an audio system 4 for outputting audible signals, a tuner 5 for receiving radio signals or television signals and a playback device 6 for DVD (Digital Versatile Disk) and CD (Compact Disk) media. In addition, the vehicle communication system has an interface 7 for connecting equipment to the user, for example a portable computer, a PDA (personal digital assistant) a CD player or the like. The interface 7 has both a wire-bound connection and a transmitter and receiver for wire-free data exchange. The wire-free data exchange is carried out using infrared in accordance with the IRDA standard.

In addition, the vehicle communication system has a mobile telephone module 8 and a plurality of operator consoles, of which just one operator console 9 is illustrated by way of example. An operator console 9 has, in each case, input units and output units, for example a keyboard, a trackball, a microphone for voice recording or as input means for a voice-operated system 10, loudspeaker, headset and a display device 31.

A locating module 11 comprises a GPS receiver, a gyroscope and a distance meter.

All the systems are connected to a common data bus 12 via a hardware interface 13 of uniform design.

The communication system is used for carrying out applications, functions and services. It can access external telematic services and the Internet via the mobile telephone module 8.

One application comprises at least one function which permits the services to be provided for the user. One function is carried out in each case in a single equipment unit.

A central system controller 17, an operator console controller 20 and a priority management system 19 are implemented with the processor unit 1. The priority management system 19 has modules which are functionally assigned to the central system controller 17, and has modules which are functionally assigned to the operator console controller 20.

By means of the priority management system 19, each operator console 9 can be respectively allocated a priority, either with respect to the entire vehicle communication system or with respect to the individual applications. In addition, the priority management system 19 controls accesses of the individual application to the data bus and to the individual operator consoles 9.

The priority management system 19 is expediently organized in a modular function. The priority management system 19 has a system-related priority management module which controls the accesses of the individual operator consoles 9 to the applications present in the vehicle communication system, and a bus-related priority module which controls the accesses and access requests of the applications to the data bus 12. In addition to these two modules, which are functionally assigned to the central system controller 17, the priority management system 19 has an operator console-related priority management module, and more precisely an operator-console-related priority management module for each operator console 9. The operator-console-related priority management module is functionally assigned to the operator console controller 20.

The bus-related priority management module prevents overloading of the data bus 12 in order to ensure sufficient data transmission quality for all the applications active at a given time. In the event of impending overloading of the data bus 12, a new application is permitted only if corresponding free bus capacities can be provided simultaneously by means of suitable measures. In particular in the case of an access of a high-ranking application, such as a traffic jam warning for the driver of the vehicle, one or more low-ranking applications are terminated or their data transmission is reduced. Likewise, actions and applications of operator consoles which are given a low ranking can be terminated or reduced. The latter can signify that the bus-related priority management module reduces the quality of a video transmission in order to reduce the data volume on the data bus 12.

The bus-related priority management module takes account, in particular, of the fact that certain data of applications, such as a telephone call, have to be transmitted without delay in real time.

In addition, the bus-related priority management module ensures that the bus capacity is occupied only up to a defined threshold so that sufficient transmission capacity is available for particularly high-ranking applications, for example the automatic or manual transmission of an emergency call via the mobile telephone module 8.

The bus-related priority management module can be configured in order to determine those users, applications or actions which will be switched off in the case of an excessively high bus load, or which will have their data transmission delayed or have their transmission quality impaired.

The priority management 19 also comprises a priority master which resolves conflicts between individual modules of the priority management. Here, the priority master is superordinate to the system-related, operator-console-related and bus-related priority management modules. A presetting which has been made by means of the system-related priority management module enjoys, once more, priority here over the operator-console-related priority management module. A high priority which has been specified for a "telephone" application by the system-related priority module sets the operator-console-related priority management modules to a corresponding priority.

In addition, there is provision in this exemplary embodiment for the priority master also to be superordinate to the central operator console controller 20 and the resource management system described below.

The possible cases of conflict between the modules of the priority management system are stored in a matrix and can be set by means of a general system configuration module. This general system configuration module has a presetting with which the vehicle communication system is supplied to an end customer. It can be provided with a plurality of additional presettings ex works so that a user can select between a plurality of typical possibilities without himself having to perform a configuration.

Thus, in one presetting there may be provision for the driver of the vehicle to be provided with both visual and audible navigation information from the navigation device 2. In another presetting there may be provision for the driver of the vehicle to be provided only with audible navigation information in order to avoid him being distracted from the events on the road. However, at the same time it is possible to provide a visual playback of a road map with navigation symbols for a passenger. In this case, the driver of the vehicle is not provided with any access right to the visual output of the navigation device 2.

For each operator console 9, the interaction of the individual operator console 9 with the entire vehicle communication system, and in particular with the central system controller, is regulated by means of an operator console controller 20.1, 20.2. In addition, the operator console controller 20.1, 20.2 controls the user interface of an operator console. The operator console controller comprises modules 20.2 which are functionally assigned to the individual operator consoles 9. These local modules 20.2 may be implemented in the central processor unit. In this exemplary embodiment, they are, however, implemented in the individual operator consoles and are administered by a central module 20.1 of the central processor unit 1, although they could also be administered by local processor units of the operator consoles.

The operator console controller of an operator console 9 comprises the operator-console-related priority management module and an operator console configuration module. The latter is a subunit of an operation management system, and more precisely of an operation management configuration module.

The operation management system has modules which are functionally assigned to the central system controller 17, and contains modules which are functionally assigned to the operator console controller 20.

The operator-console-related priority management module determines the priorities of the applications present in the vehicle communication system with respect to their access rights to the output devices of the operator console.

The operator-console-related priority management module is functionally assigned to the operator console controller 20, but it is nevertheless in a subordination relationship with respect to the central priority management system 19 which is functionally assigned to the central system controller 17.

FIG. 2 illustrates an application 15 which accesses functions 16.1 to 16.5, the functions being embodied within various devices.

The application 15 illustrated relates to a vehicle navigation system. The navigation device 2, the locating module 11 and the audio system 4, inter alia, are connected via the data bus 12. The devices each have a hardware interface 13 with which they are physically connected to the data bus 12. The functions 16.1 to 16.5 which are implemented in the devices each have their own software interfaces 18.1 to 18.5. The data of the hardware interfaces 13 are converted by these software interfaces into input parameters for the functions 16.1 to 16.5 which are assigned to the respective software interfaces 18.1 to 18.5. The output parameters of the corresponding functions 16.1 to 16.5 are converted by the software interfaces 18.1 to 18.5 assigned to the respective functions 16.1 to 16.5 into data for the other software interfaces 18.1 to 18.5 and/or of the hardware interfaces 13.

When the "navigation" application is called, the navigation device 2 which is equipped with a microprocessor makes available a start menu on a display device of the requesting user. The start menu can be configured individually for the operator console using the operator console controller.

After the inputting of a line, function 16.3 firstly determines the instantaneous location of the vehicle. To do this, the function 16.3 accesses the locating module 11. The locating module 11 comprises a function 16.1 for absolute determination of the location by means of a GPS receiver, and a function 16.2 for relative determination of the location by means of angular measurement and measurement of the distance covered (compound navigation). This data is transferred by the functions 16.1 and 16.2 to the navigation device 2 via the software interfaces 18.1 and 18.2 and the hardware interface 13.

After this data has been input, the function 16.3 requests the road network data required to calculate a route from the application 15 of the DVD playback device, which is not illustrated in FIG. 2, and calculates a suitable route to the destination.

The function 16.4 determines driving instructions for the route determined by the function 16.3. The driving instructions are output by the function 16.4 in good time before each maneuver which is to be initiated by the driver of the vehicle, to the audio system 4 as voice information via the data bus 12. The function 16.5 of the audio system converts the voice information into audible signals, amplifies them and plays them back via loudspeakers.

The vehicle communication system has a resource management system controlling the interplay between the user interface, application and function units. This resource management system is composed of a function management module, an access conflict management module and a bus capacity management module.

The function management module has the "function availability", "functional status" and "functional use management" submodules. In addition, a module may be provided for the configuration of the functional management module in order, for example, to be able to carry out tests by gating out a function.

The "functional availability" submodule administers a list containing all the functions which can be executed in the vehicle communication system, for example the "forward", "stop", "playback" "pause" etc. operator functions of the DVD playback device.

The "function status" submodule contains the type of function (controlling or interrogating), the status indicating whether the function is being used by an application, if appropriate by which application the function is being used and from which operator console the function is being used.

At the operator console it is possible to differentiate between the operator terminal (input means) and the output device. This submodule maps real system states and system properties.

The "function use management" submodule covers the potential logic connection possibilities between the functions which can be executed, the equipment units and applications and the operation possibilities for a specific application. In the "function use management" submodule, information is stored indicating which data source can transmit its data to which data sinks on the basis of the physical peripheral conditions.

The access conflict management module has the "source access", "sink accesses" and "configuration of the access management system" submodules.

The access conflict management module reports conflicts which have come about to the central priority management system. It therefore detects the instantaneous state of the entire vehicle communication system for the priority management system.

The bus capacity management module has the "detection of impending overloading", "detection of existing conflicts" and "configuration of the bus capacity management module" submodules. The bus capacity management module reports, like the access conflict management module, the acquired results to the central priority management system. In this context, the results are relevant in particular for the bus-related priority management system.

The "configuration of the bus capacity management module" submodule permits threshold values, for example the threshold for impending overloading of the data bus 12, to be set. In contrast to the modules of the bus-related priority management system which handle bus accesses, the bus capacity management module merely determines the system history, supplies an estimate of the possible subsequent state and if appropriate outputs a message or warning.

The resource management system is functionally assigned to the central system controller.

FIG. 3 illustrates the method of operation of the operator console controller and of the operation management system.

An output device 21 of an operator console makes available a user interface 22 for the user. Provided on the user interface 22 is a field A for e-mails, a field B for traffic news, a field C for incoming telephone calls and a field D for the outputting of navigation information of the "navigation" application.

Incoming e-mails are presented in field A. Traffic news is displayed in the inactive field B (illustrated by broken lines) if a relevant traffic message arrives in the vehicle communication system, and a "traffic jam warning" application or function accesses the output device 21.

In field C, a "call" selection element lights up as soon as a call arrives for this operator console of the display device 21. The call can be accepted by activating an operator key, a voice command or the like.

The operation management system controls the user interface. It respectively assigns to the individual applications for the individual operator console a start menu and a section on the screen in which they can be displayed.

The operator management system has, in addition to the operation management configuration module already mentioned above, also the "automatic state system", "outputting of source data" and "assignment of operator con soles to displays" modules.

The "automatic state system" module has the "automatic state overall system" and "automatic state system location 1 to automatic state system location N" submodules. These automatic state systems detect only the real states of the vehicle communication system and not the freely definable system states.

The "automatic state overall system" stores the system states (for example "DVD playback device operating"), the events which are intended to trigger a transition into new states (transition states) and the subsequent states which occur after actions have been triggered. As a result, the system states which are detected can be connected to the masks of the user interface or to the information which is to be output to the user.

The automatic state systems of the locations 1 to N detect the relevant history of an operation procedure and the applications which are being used by the respective operator console at that time. In addition, all the operation possibilities available in the vehicle communication system are stored.

The operation management configuration module has the "overall system configuration", "operator console configuration location 1" to "operator console configuration location N" submodules. These modules relate exclusively to freely definable system states.

The configuration modules are used to set the user interface and the operation menus. It is possible to set which start screen and which start menu will be displayed, as well as the method of operation desired by the user. The latter may be distinguished as "advanced control", "new user control" or "child-friendly control". Here, the configuration can be performed individually for the operator console N using the operator console configuration module location N".

The "outputting of source data" module brings about the connection between the inputs of a user and the source data which are output at the operator console and are received via the data bus, for example. The source data are intended to be displayed to the user regularly. The organization of a display is brought about by this module, together with the corresponding user menu or as an alternative to this user menu. Source data are therefore connected to configurable user menus.

In order to assign the operator terminals to displays, the "assignment of operator consoles to displays" module resorts to the "function use management" submodule of the function management system of the resource management system. This ensures that only a selection of combination possibilities which are appropriate for the user are made available. The vehicle communication system is delivered ex works with a basic setting for the assignment of the operator terminals to the output devices.

In addition, the "assignment of operator consoles to displays" module can also assign a remote control function to a specific operator console.

What is claimed is:

1. A communication system which has:
   at least one processor unit (1), arranged in the vehicle, for controlling applications (15),
   a plurality of different data sources (2, 4, 5, 6, 8) which are connected to the processor unit (1),
   a plurality of operator consoles (9) which are connected to the processor unit (1) and have user interfaces for accessing the applications (9) and for data playback, and
   a central system controller (17) having a priority management system (19) which allocates to the individual operator consoles (9) access rights with different degrees of priority to the applications (15).

2. The vehicle communication system as claimed in claim 1, characterized in that functions (16) which are implemented on the processor unit (1) or on a data source (2, 4, 5, 6, 8) are assigned to the applications (15).

3. The vehicle communication system as claimed in claim 1, characterized by an operator console controller (20.1, 20.2) with which the individual operator consoles (9) can be individually configured.

4. The vehicle communication system as claimed in the preceding claim, characterized in that the priority management system (19) allocates to the applications (15) individual access rights to a data bus (12) and/or to the processor unit (1).

5. The vehicle communication system as claimed in the preceding claim, characterized in that the priority management system (19) allocates to the applications (15) access to the data bus (12) as a function of the loading of the data bus (12) at that time.

6. The vehicle communication system as claimed in claim 4, characterized in that when a defined load of the data bus (12) is reached or exceeded, at least one low-level application is aborted or its data transmission rate is reduced.

7. The vehicle communication system as claimed in claim 4, characterized in that the access of an application (15) to the data bus (12) can be controlled as a function of the priority of the requesting operator console (9).

8. The vehicle communication system as claimed in claim 1, characterized in that the operator console controller (20.1, 20.2) allocates individual access rights to the applications (15) for the access to an operator console (9).

9. The vehicle communication system as claimed in claim 1, characterized in that a user interface (22) of an operator console (9) can be configured individually by the operator console controller (20.1, 20.2).

10. A method for exchanging data in a vehicle, in which at least one processor unit (1) and a plurality of data sources (2, 4, 5, 6, 8) communicate with operator consoles (9) via a data bus (12), different applications (15) being controlled by the processor unit (1) so that they output onto different output devices (21), access rights to the applications (15) being allocated to the operator consoles (9), access rights with different degrees of priority to the applications (15) being allocated to the individual operator consoles (9).

11. The method as claimed in the preceding claim, characterized in that an operator console controller (20.1, 20.2) controls one or more of the following functions individually for an operator console (9):

user prompting at the man/machine interface, assignment of running applications or their menus to defined positions of a display device, assignment of the access right of applications to an output device of the operator console.

* * * * *